United States Patent [19]
Bendall

[11] 3,815,964
[45] June 11, 1974

[54] BEARINGS
[76] Inventor: Wilfrid H. Bendall, 12 Castle Hill Rd., Pawcatuck, Conn. 02891
[22] Filed: June 5, 1972
[21] Appl. No.: 259,762

Related U.S. Application Data
[63] Continuation-in-part of Ser. No. 239,210, March 29, 1972, Pat. No. 3,756,674.

[52] U.S. Cl. .................................. 308/78, 308/122
[51] Int. Cl. ............................................ F16c 33/66
[58] Field of Search ............... 308/72, 238, 78, 121

[56] References Cited
UNITED STATES PATENTS

| | | | |
|---|---|---|---|
| 2,906,569 | 9/1959 | Runton et al. ..................... | 308/238 |
| 3,133,769 | 5/1964 | Drake ................................ | 308/36.1 |
| 3,575,785 | 4/1971 | Pietrocini et al. ................. | 308/238 |

Primary Examiner—Charles J. Myhre
Assistant Examiner—Frank Susko

[57] ABSTRACT

Concentric bearing ring members have contiguous sliding bearing surfaces, the bearing surface of one of the members having alternating axially disposed bearing portions and grooves providing lubricant storage capacity. The construction seals and limits lubricant flow to the amount required to maintain a load-supporting film at the bearing contacts. The disclosure illustrates and describes spherical self-aligning, conical thrust, and straight radial bearing embodiments of the invention.

10 Claims, 9 Drawing Figures

PATENTED JUN 11 1974 3,815,964

BEARINGS

BACKGROUND OF THE INVENTION

This application is a continuation-in-part of copending application Ser. No. 239,210, filed Mar. 29, 1972, now U.S. Pat. No. 3,756,674 by the same applicant.

The present invention relates to improvements in bearings embodying elastohydrodynamic sliding bearing operating principles and more particularly to their embodiment in preadjusted, prelubricated and sealed bearing units, interchangeable with rolling element bearings. Such units have been proposed in the art over the past 40 years but apparently have not come into commercial use or availability. It is generally observed, however, that sliding fluid film bearings, in principle and as compared with rolling element bearings, potentially offer the advantages of simpler manufacture, higher specific capacity, quieter operation, unlimited fatigue life and lower maintenance. The practical realization of these desirable performance criteria appears to depend largely on the character, arrangement and assembly of the bearing elements and on reliable provision for a continuous lubricating film at the bearing contact areas without generating destructive internal temperatures owing to fluid friction and viscous shear of the lubricant. This is especially problematical with grease and heavy-bodied lubricants which are otherwise preferable as simplifying bearing closure requirements, and for protection of the bearing interior against the entrance of contaminants.

SUMMARY OF THE INVENTION

The broad object of the present invention may be inferred from the foregoing remarks on the advantages and problems involved in producing bearings of the type referred to. Other specific objects are to provide such a bearing with elastohydrodynamic contacts in a form convenient and economical to manufacture; to provide a bearing of this type with integral bearing portions better adapted to utilize hydrodynamic bearing principles; also a bearing industrially applicable as a preadjusted, prelubricated and sealed unit adapted for extended, maintenance-free operation by provision of a relatively large integral lubricant storage capacity; a bearing of the type described particularly adapted to use lubricants of high viscosity without generating excessive internal friction and lubricant shear losses — accordingly, a bearing arranged to confine lubricant flow to a rate and volume required to constitute a load-bearing film only at the contact areas; such a bearing in which all other parts of the contained lubricant volume are relatively free from rubbing and shearing contacts and are conveyed in relatively inert motion synchronous with the rotating bearing element; such a bearing, again, economically adapted to construction and operation with contact areas of radial, conical or spherical form, as desired.

All of the foregoing and other objects of the present invention and the advantages of bearings constructed in accordance therewith follow reference to the accompanying drawings, wherein.

DESCRIPTION OF THE PREFERRED EMBODIMENTS

Figure 1:
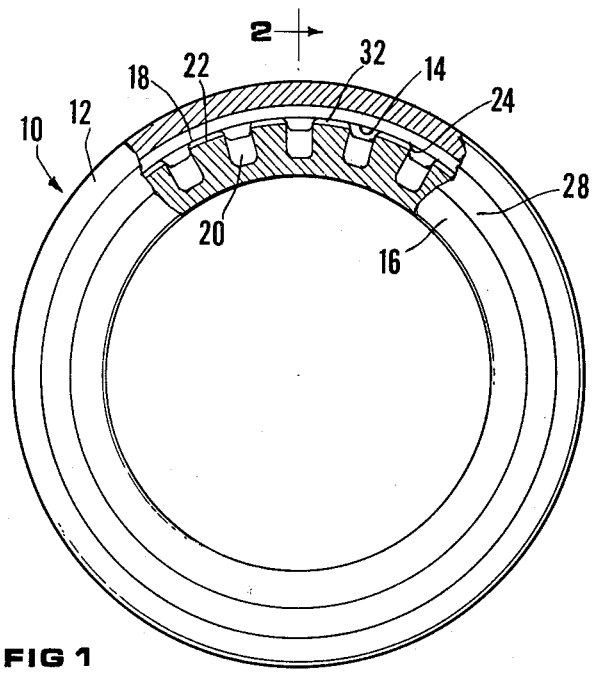
FIG. 1 is a partly sectioned side elevational view of a bearing of the present invention.
Figure 2:
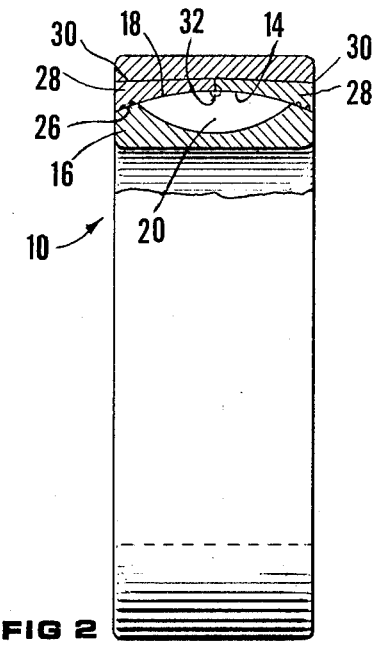
FIG. 2 is a partly sectioned view taken on the line 2—2 of FIG. 1.

With reference to the drawings, a bearing assembly embodying a a self-aligning spherical form of the bearing of the present invention is illustrated in FIGS. 1 and 2. Reference numeral 10 generally designates the bearing assembly comprising a composite outer ring 12 having an internally spherical bearing surface 14, and an inner ring 16 having an externally spherical bearing surface 18 contiguous with bearing surface 14 for rotation relative thereto.

Inner ring surface 18 comprises a plurality of circumferentially spaced, axially extending arcuate grooves 20 alternating with spherical bearing surface portions 22. The grooves convey lubricant for entrainment at the bearing portions following inner ring rotation in either direction, the edges 24 of the bearing portions being slightly rounded to facilitate this. Circumferential width of the bearing portions relative to their axial length preferably is kept small and may be as little as one fifth of the length to limit unrelieved shear and heating of the lubricant wedged under load.

While materials of construction for the bearings of this invention may comprise any practicable bearing material or compatible material combination, maximum performance will be attained with bearing materials and surface finishes customarily specified for high quality rolling element bearings.

As shown in the drawings, grooves 20 and bearing portions 22 extend axially to annular surface portions 26 at each end of the ring members, which are in continuous sealing proximity with the outer ring internal surface 14. For convenience in manufacture and assembly the composite outer ring 12 comprises two oppositely assembled internally spherical annular members 28 in elastically sprung insertion and retention in the bore of the ring. Members 28 are made sectionally thin and resilient to facilitate this assembly with an interference fit in the shallowly conical bore surfaces 30 of the ring.

Either prior to or after assembly of the members 28 on each side of the inner ring the grooves may be filled with a suitable grease lubricant, the spherical seating of the ring enabling it to be rotated to a substantially right-angled axial position for this purpose. It will be observed that subsequent renewal of the lubricant, if required, is facilitated by this arrangement. Uniform distribution of the lubricant during bearing operation, in case of irregular initial filling, is ensured by provision of a circumferential groove 32 traversing the bearing portions and interconnecting the axially disposed grooves, the groove 32 effectively providing equalization of lubricant.

Assembled as described, the spherical form of the bearing of this invention is able to carry combined axial and readial loads for long periods of time with complete freedom from misalignment stresses and lubricant maintenance. The critical bearing lubricant requirement, common to all types of bearings, is met in the present instance by the positive accessibility of the lubricant in the grooves to the plurality of circumferentially short bearing lands. Lubricant is carried in the grooves in a relatively inert, non-turbulent state under centrifugally induced pressure against the bearing surface of the outer ring. It is thus available for instant entrainment of a supporting film at the bearing contacts, the volume of lubricant flowing for this purpose being limited to the amount entrained during rotation.

Figure 3:
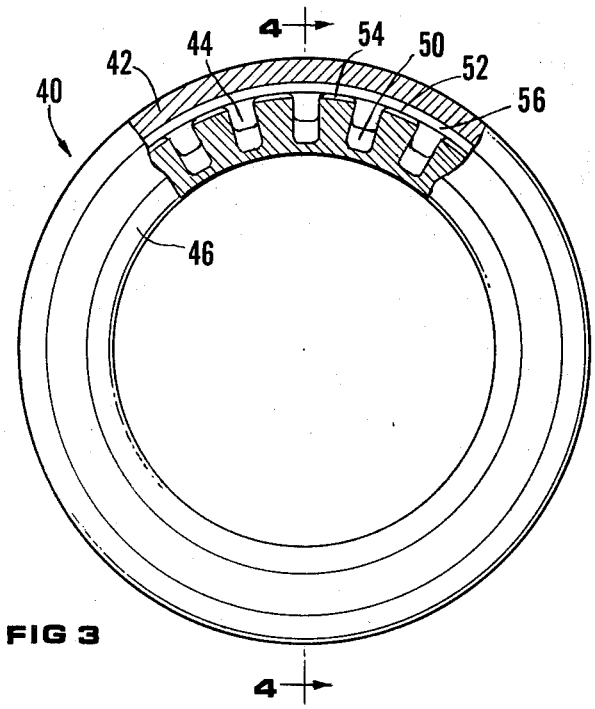
FIG. 3 is a partly sectioned side elevational view of a second embodiment of the present invention.
Figure 4:
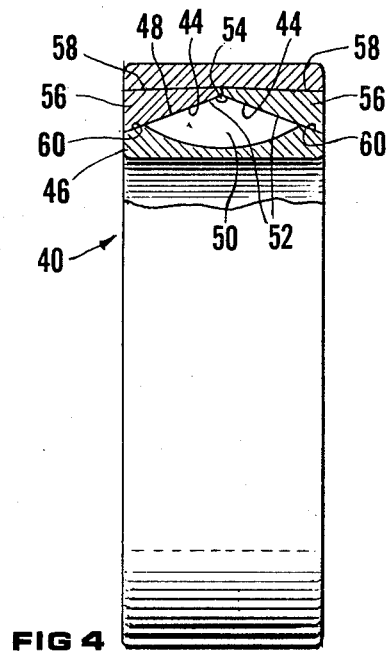
FIG. 4 is a partly sectioned view taken on the line 4—4 of FIG. 3.

Referring again to the drawings, the second embodiment of the bearing of this invention disclosed in FIGS. 3 and 4 differs primarily from the preceding embodiment in providing opposed conical bearing surfaces capable of withstanding high radial and thrust loads. In other respects the method of assembly and lubrication, and materials of construction, are substantially identical with those stated as preferable for the preceding embodiment.

As is well known in the art, rolling element bearings employing truncated conical rollers and raceways are considered to offer the best combination of high radial and thrust capacity at low to moderate speeds. Apart from the speed limitation a disadvantage of such bearings is the need to provide for adjustment and the unsuitability of its single row form for application as an integral bearing unit. The bearing modification illustrated in FIGS. 3 and 4 embodies the advantages of the conical bearing form and avoids the shortcomings noted. Reference numeral 40 generally designates this bearing modification which is shown as comprising a composite outer ring 42 having opposed internally conical bearing surfaces 44 and an inner ring 46 having conical bearing surfaces 48 contiguous with surfaces 44 for rotation relative thereto. The bearing surface of inner ring 46 is provided with a plurality of circumferentially spaced, axially extending arcuate grooves 50 intersecting the conical periphery of the member and alternating with parallel, oppositely inclined conical bearing portions 52. Grooves 50 are interconnected by annular groove 54 at the apex of the conical portions. The grooves, in totality, constitute a lubricant reservoir of substantial integral capacity for extended maintenance-free operation of the bearing.

As described in principle for the preceding example of the bearing of this invention, the present modification utilizes a composite outer ring construction comprising two oppositely assembled internally conical annular members 56 in elastically sprung insertion and retention by an interference fit within shallowly conical bores 58 of the outer ring. As shown sectionally in FIG. 4, grooves 50 and opposed conical bearing portions 52 extend axially to annular conical surface portions 60 in continuous sealing proximity with the internal bearing surfaces 44 at each end of the ring members. Thus assembled the bearing is adapted for sustained operation under various combinations of radial and thrust loads, the desired proportion of thrust to radial load capacity being determined by the specific conical angle of the bearing surfaces.

Figure 5:
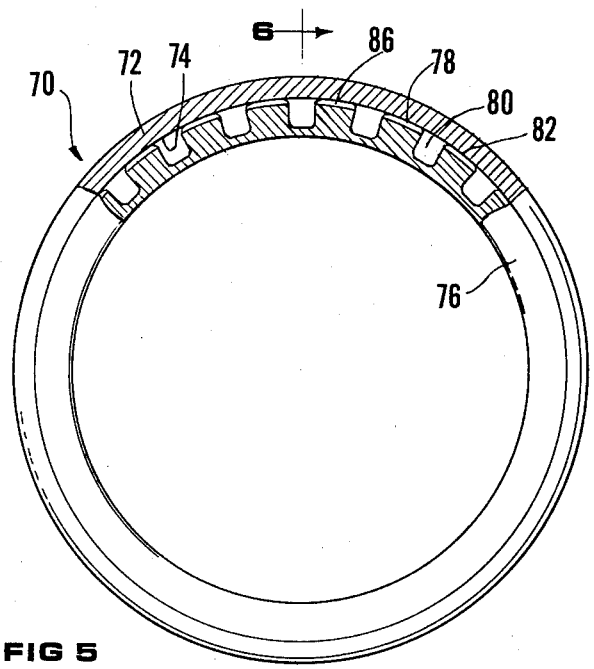
FIG. 5 is a partly sectioned side elevational view of a third embodiment of the present invention.
Figure 6:
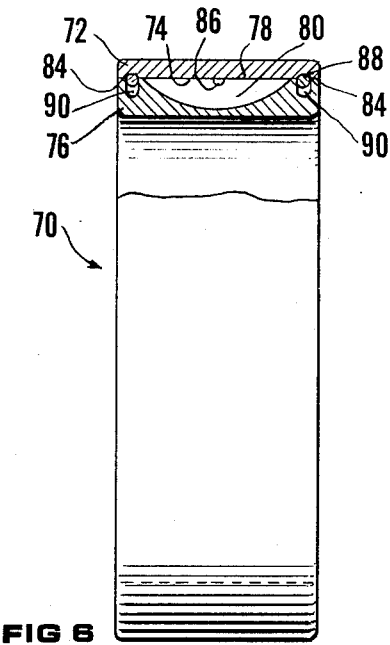
FIG. 6 is a partly sectioned view taken on the line 6—6 of FIG. 5.

The third embodiment of the bearing of this invention shown in FIGS. 5 and 6 illustrates its adaptability to fabrication in a thin-section radial form with highest radial capacity for a given space. In the drawing reference numeral 70 generally indicates this bearing, comprising an outer ring 72 having a cylindrical inner bearing surface 74, and an inner ring 76 having a grooved bearing surface 78 contiguous with surface 74 for rotation relative thereto. As in the preceding examples, inner ring 76 is provided with a plurality of circumferentially spaced, axially extending arcuate grooves 80, alternating with parallel bearing surface portions 82 extending to annular portions 84 in continuous sealing proximity with inner surface 74 at the ends of the ring members. Axial grooves 80 are interconnected by a circumferential groove 86 traversing the bearing portions of the inner ring, the interconnected grooves serving as a lubricant reservoir for extended maintenance-free operation of the bearing. The outer and inner ring members thus described are retained and additionally sealed in the concentric assembly shown by spring wire rings 88 which snap into coplanar annular grooves 90 at the ends of the ring members. Assembly is effected after application of a lubricant to the grooves by axially sliding the members into concentric alignment. As described for preceding examples of this invention, rotation of the inner ring 76 results in immediate entrainment of a load-bearing film at the bearing contacts of the assembly.

Figure 7:
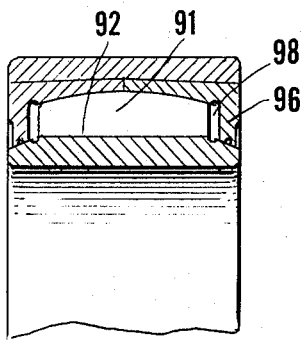
FIG. 7 is a cross-section view of a modification of the bearing shown in FIGS. 1 and 2.
Figure 8:
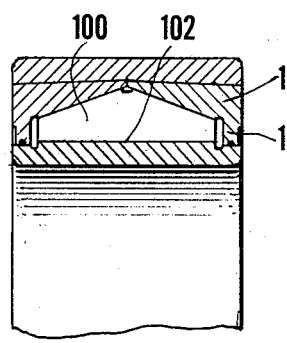
FIG. 8 is a cross-section view of a modification of the bearing shown in FIGS. 3 and 4.
Figure 9:
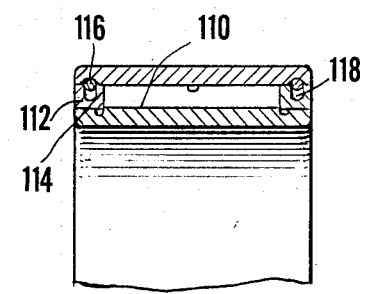
FIG. 9 is a cross-section view of a modification of the bearing shown in FIGS. 5 and 6.

It will be noted that the arcuate grooves of the bearing embodiments described above may alternatively be formed with axially straight root sections producible by broaching or equivalent forming operation, especially where it may be desired to slightly undercut the bearing portions of the inner ring members. FIGS. 7, 8 and 9 accordingly show the earlier illustrated embodiments in FIGS. 1 to 6, inclusive, modified to utilize straight grooves.

As shown in FIG. 7, the modified spherical inner ring of FIG. 2 is provided with axially extending grooves 90 having straight root portions 92 and outer ring members having an internally spherical bearing surface with integral sealing flanges 96. Annular clearances 98 provide for the self-aligning angular motion of the inner ring.

Modification of the bearing of FIGS. 3 and 4 for the same purpose is illustrated in sectional drawing FIG. 8 which shows groove 100 with axially straight root portions 102 and outer ring bearing portions 104 with integral sealing flanges 106 and the contiguous ring end portions.

A corresponding modification of the bearing of FIGS. 5 and 6 is illustrated in FIG. 9 which shows the alternative axially straight lubricant groove 110 enclosed at the ends by separate annular sealing rings 112 press-fitted to shoulders 114 on the inner ring. The sealing rings are shown as provided with spring wire snap rings 116 engaging coplanar annular grooves 118 at the contiguous end portions of the ring members.

It is to be understood that while the outer ring members of the bearing of this invention illustrated in the accompanying drawings and described in the foregoing text are shown as parts of an integral bearing assembly, they may alternatively comprise parts of a machine housing or the like for reception of inner ring members of the form illustrated herein. The inner members likewise may comprise integral parts of a drive shaft, these and other such modifications of the present invention being properly within the scope thereof and of the appended claims.

What is claimed is:

1. A bearing comprising inner and outer ring members having contiguous sliding bearing surfaces, one of said members being arranged for rotation within the other and having a bearing surface substantially divided between a plurality of alternating axially disposed grooves and bearing portions, said bearing portions having a pair of annular surface portions in circumferential sealing proximity with said other member at each of their contiguous ends, a circumferential lubricant equalizing groove interconnecting and greatly smaller than the axially disposed grooves, said bearing portions having a circumferential width small with respect to the length and being shaped to entrain a load-supporting lubricant film between said members, the totality of said grooves comprising an interconnected reservoir for retention and non-turbulent translation of a lubricant to the bearing portions, a lubricant in said grooves under relatively inert centrifugally induced pressure, said grooves and said sealing proximity confining the lubricant flow to the axially disposed bearing portions and limiting the rate and the volume thereof to the amount thus entrained.

2. The bearing of claim 1 wherein said other annular bearing portions comprise two oppositely assembled annular rings in elastically sprung insertion and retention between said members.

3. The bearing of claim 2 wherein said annular bearing portions further comprise spherical bearing surfaces contiguous with a spherical surface of said other member.

4. The bearing of claim 2 wherein said annular bearing portions further comprise conical bearing surfaces contiguous with conical surfaces of said other member.

5. The bearing of claim 2 wherein said annular bearing portions further comprise oppositely assembled annular rings having internal bearing surfaces and having external locking surfaces adapted for elastically sprung insertion and retention in the bore of said other member.

6. The bearing of claim 1 wherein said circumferential sealing proximity further comprises internal and external annular grooves in coplanar alignment at contiguous end portions of said members and sealing and retaining rings in resiliently sprung insertion in said grooves.

7. The bearing of claim 1 wherein said contiguous bearing surfaces are spherical in form.

8. The bearing of claim 1 wherein said contiguous bearing surfaces are conical in form.

9. The bearing of claim 1 wherein said axially disposed grooves are arcuate in form.

10. The bearing of claim 1 wherein said contiguous sliding bearing surfaces are substantially parallel.

* * * * *